(12) United States Patent
Scopesi et al.

(10) Patent No.: US 11,733,110 B2
(45) Date of Patent: Aug. 22, 2023

(54) STRAIN SENSOR SYSTEM AND MACHINE ELEMENT COMPRISING STRAIN SENSOR SYSTEM

(71) Applicant: DANA ITALIA S.R.L., Arco (IT)

(72) Inventors: Marco Scopesi, Isera (IT); Bruno Dalvit, Arco (IT)

(73) Assignee: DANA ITALIA S.R.L., Arco (IT)

( * ) Notice: Subject to any disclaimer, the term of this patent is extended or adjusted under 35 U.S.C. 154(b) by 178 days.

(21) Appl. No.: 17/356,345

(22) Filed: Jun. 23, 2021

(65) Prior Publication Data

US 2021/0404893 A1 Dec. 30, 2021

(51) Int. Cl.
*G01L 1/00* (2006.01)
*G01L 1/22* (2006.01)

(52) U.S. Cl.
CPC .......... *G01L 1/2287* (2013.01); *G01L 1/2206* (2013.01)

(58) Field of Classification Search
CPC ............................ G01L 1/2287; G01L 1/2206
See application file for complete search history.

(56) References Cited

U.S. PATENT DOCUMENTS

2019/0271407 A1\* 9/2019 Scopesi ................. F16K 31/383

\* cited by examiner

*Primary Examiner* — Jamel E Williams
(74) *Attorney, Agent, or Firm* — McCoy Russell LLP

(57) ABSTRACT

A strain sensor system having a first base plate with an elongate shape defining a first longitudinal axis, a first strain sensor disposed on the first base plate, a second base plate having an elongate shape defining a second longitudinal axis, a second strain sensor disposed on the second base plate, and a control unit configured to process measurement data produced by the first strain sensor and by the second strain sensor, wherein the first base plate and the second base plate are disposed such that the first longitudinal axis is arranged orthogonally or essentially orthogonally with respect to the second longitudinal axis.

18 Claims, 2 Drawing Sheets

STRAIN SENSOR SYSTEM AND MACHINE ELEMENT COMPRISING STRAIN SENSOR SYSTEM

CROSS-REFERENCE TO RELATED APPLICATION

The present application claims priority to German Utility Model Application Serial No. 20 2020 103 648.3, entitled "STRAIN SENSOR SYSTEM AND MACHINE ELEMENT COMPRISING STRAIN SENSOR SYSTEM," and filed on Jun. 24, 2020. The entire contents of the above-listed application are hereby incorporated by reference for all purposes.

TECHNICAL FIELD

The application primarily relates to a strain sensor system for measuring strain in a machine element, such as a vehicle axle. Further, the present application relates to a machine element, such as a vehicle axle, comprising such a strain sensor system.

BACKGROUND AND SUMMARY

Stability control of a vehicle such as a telescopic boom handler, a forklift, crane and/or excavator by monitoring the forces acting on the wheels of the vehicle is known from prior art. To this end, strain gauges may be positioned on one or more vehicle axles to detect the deformation of a vehicle axle. This deformation may be indicative of a load or an impending tip-over of the vehicle.

However, the accuracy of the estimates through deformation measurements is often impaired by a number of factors. These may include temperature conditions, vehicle dynamics, and road conditions, for example. As a result, a deformation caused, for example, by heat during normal vehicle operation may be erroneously identified as a certain load or an impending tip-over. Such false positives may compromise usability of the detection system. For example, the operator may be prevented from performing an operation in a situation where the vehicle is in a stable condition and in no danger of tipping over.

It is therefore an object of the present disclosure to provide a strain sensor system and a machine element which are configured to detect, with improved accuracy, a load and/or an impending tip-over of a vehicle.

The provided strain sensor system comprises a first base plate having an elongate shape defining a first longitudinal axis, a first strain sensor disposed on the first base plate, a second base plate having an elongate shape defining a second longitudinal axis, a second strain sensor disposed on the second base plate, and a control unit configured to process measurement data produced by the first strain sensor and by the second strain sensor.

The first base plate and the second base plate are disposed such that the first longitudinal axis is arranged orthogonal or essentially orthogonal with respect to the second longitudinal axis.

The base plates may have a length l and a width w. Typically, the length l is a maximum possible elongation along or parallel to the longitudinal axis of the respective base plate. Typically, the width w is a maximum possible extension along or parallel to an axis perpendicular to the longitudinal axis of the respective base plate. In the present application, the expression "elongate shape" may be interpreted such that a length l is at least twice a width w, at least 2.5 times a width w, or at least three times a width w.

The advantage of a perpendicular arrangement of the base plates may be that it may be capable of detecting and compensating for deformations which are merely caused by temperature changes. For example, thermal expansion of a heated body in a given direction is proportional to the body's size or length in that direction. Therefore, when undergoing a temperature change, a single elongate base plate may expand by different amounts along its length and along its width. A sensor including strain gauges disposed on such a single elongate base plate may therefore mistake this non-uniform thermal expansion as being caused by a mechanical strain on the base plate. By contrast, two elongate base plates arranged perpendicularly with respect to each other may detect the same apparent strain when expanding or contracting due to a temperature change, but in mutually orthogonal directions. This may then allow for a detection of false positive strain measurements, for example using appropriate data analysis.

In one embodiment, the first base plate and/or the second base plate include a first set of strain sensors comprising the first strain sensor and a second strain sensor. The second strain sensor may be arranged orthogonal or essentially orthogonal with respect to the first strain sensor. This arrangement may compensate temperature influence on each baseplate.

In one embodiment, the first base plate and/or the second base plate further include a second set of strain sensors. The second set may comprise a third strain sensor and a fourth strain sensor. The fourth strain sensor may be disposed essentially orthogonally with respect to the third strain sensor.

Typically, the base plate comprises a top side and an opposite bottom side. In one embodiment, the first strain sensor and/or the first set of strain sensors are/is disposed on a top side of the respective first base plate or second base plate. The base plate may be disposed on a machine element with its bottom side.

Additionally or alternatively, the second set of strain sensors may be disposed on a bottom side of the respective first or second base plate.

An arrangement of two strain sensors on top of one base plate, or on top of each of the base plates, and an arrangement of two strain sensors on a bottom side of the one base plate, or on the bottom side of each of the base plates, may compensate bending strains induced by the flexibility of the base plate itself. Traction and compression strain may be fully retained.

The first strain sensor of the first base plate may have a first electrical connection. The first strain sensor of the second base plate may have a first electrical connection. The second strain sensor of the first base plate may have another first electrical connection. The second strain sensor of the second base plate may have another first electrical connection. The first and the second electrical strain sensors of the first base plate may have a common second electrical connection. The first and the second electrical strain sensors of the second base plate may have a common second electrical connection.

The third strain sensor of the first base plate may have a first electrical connection. The third strain sensor of the second base plate may have a first electrical connection. The fourth strain sensor of the first base plate may have another first electrical connection. The fourth strain sensor of the second base plate may have another first electrical connection. The third and the fourth electrical strain sensors of the first base plate may have a common second electrical connection. The third and the fourth electrical strain sensors of the second base plate may have a common second electrical connection.

In one embodiment, the first set of strain sensors and the second set of strain sensors of the first base plate may be electrically connected. In one embodiment, the first electrical connection of the first strain sensor of the first base plate and the first electrical connection of the third strain sensor of the first base plate may be connected and the first electrical connection of the second strain sensor of the first base plate and the first electrical connection of the fourth strain sensor of the first base plate may be connected.

In one embodiment, the first set of strain sensors and the second set of strain sensors of the second base plate may be electrically connected. The first electrical connection of the first strain sensor of the second base plate and the first electrical connection of the third strain sensor of the second base plate may be connected and the first electrical connection of the second strain sensor of the second base plate and the first electrical connection of the fourth strain sensor of the second base plate may be connected.

In one embodiment, the first base plate and the second base plate have identical elongate shapes. Two identical or nearly identical non-uniformly shaped base plates such as two elongate base plates arranged perpendicularly with respect to each other may detect the same apparent strain when expanding or contracting due to a temperature change, but in mutually orthogonal directions. A detection of false positive strain measurements may be achieved.

Alternatively or additionally, the first base plate and the second base plate are made of the same material. A thermal expansion of the base plate may depend on a material of the base plate. Two base plates made of the same material may detect the same apparent strain when expanding or contracting due to a temperature change. A detection of false positive strain measurement may be achieved.

In one embodiment, the first base plate and the second base plate each have a length l, wherein a maximal distance between the first base plate and the second base plate is at most 1, at most ½, or at most ⅓. An arrangement of the two base plates at such a maximal distance may result in the first and second base plates being exposed to the same or at least almost the same external conditions, for example the same temperature conditions.

Typically, the first strain sensor of the first base plate and/or the second strain sensor of the first base plate and/or the third strain sensor of the first base plate and/or the fourth strain sensor of the first base plate are each configured to measure a strain in the first base plate.

Typically, the first strain sensor of the second base plate and/or the second strain sensor of the second base plate and/or the third strain sensor of the second base plate and/or the fourth strain sensor of the second base plate are each configured to measure a strain in the second base plate.

In one embodiment, the control unit is connected to the first strain sensor of the first base plate and/or the second strain sensor of the first base plate and/or the third strain sensor of the first base plate and/or the fourth strain sensor of the first base plate.

The control unit may be connected to the first strain sensor of the second base plate and/or the second strain sensor of the second base plate and/or the third strain sensor of the second base plate and/or the fourth strain sensor of the second base plate.

The control unit may be configured to receive measurement data of the respective strain sensor, which may be the first strain sensor of the first base plate and/or the second strain sensor of the first base plate and/or the third strain sensor of the first base plate and/or the fourth strain sensor of the first base plate and/or the first strain sensor of the second base plate and/or the second strain sensor of the second base plate and/or the third strain sensor of the second base plate and/or the fourth strain sensor of the second base plate.

The control unit may be configured to process measurement data produced by the respective strain sensor, for example to compare measurement data of the respective strain sensor of the first base plate with the measurement data of the respective strain sensor of the second base plate, and/or to compare the measurement of a combination of strain sensors on the first base plate with a combination of strain sensors on the second base plate, which may be the same combination of strain sensors on the second base plate.

The strain sensors may be electrically connected in series. The strain gauges may be electrically connected in parallel. A combination of strain sensors may be connected in series. Another combination of strain sensors may be connected in parallel.

The strain sensors mentioned in this application may be strain gauges.

In one embodiment, the control unit may be configured to determine, based on a measurement data of a strain sensor of the first base plate and based on a measurement data of a strain sensor of the second base plate, if the measurement data of strain sensor of the second base plate is indicative of an impending tip-over of a vehicle and/or of a load on a machine element, such as a load on an axle. The control unit may be configured to determine, based on a measurement data of a first, second, third and/or fourth strain sensor of the first base plate and based on the measurement data of the corresponding first, second, third, and/or fourth strain sensor of the second base plate, if the measurement data of the respective strain sensor or the respective strain sensors of the second base plate is/are indicative of an impending tip-over of a vehicle and/or of a load on a machine element, such as a load on an axle.

The control unit may be configured to adjust the measurement data on which a determination of whether an impending tip-over of the vehicle or on which a determination of a load on a machine element is based.

For example, the control unit may be configured to adjust the measurement data when a strain measured along the longitudinal axis of the first base plate is identical to a strain measured along a longitudinal axis of the second base plate. In certain embodiments, the control unit may be configured to decrease a determined strain by the identified identical strain value measured along the longitudinal axis of the first base plate and the second base plate.

The present application further relate to a machine element, such as a vehicle axle, including a corresponding strain sensor system.

In one embodiment, the machine element may comprise a recess formed in the machine element. The first and/or the second base plate may be disposed in the recess to protect the sensor system from damage, for example by shocks or dirt. The recess may be closed with a lid or a cover. The cover or lid may be a plate. The cover or lid may be screwed to the machine element. The lid or cover may be sealed with the machine element to protect the interior of the recess from dirt and/or dust and/or oil and/or water.

The base plates may be screwed to the machine element.

Further objects, advantages, and features will become more apparent upon reading of the following non-restrictive description of illustrative embodiments thereof, given by way of example only with reference to the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

In the appended drawings.

DETAILED DESCRIPTION

Figure 1:
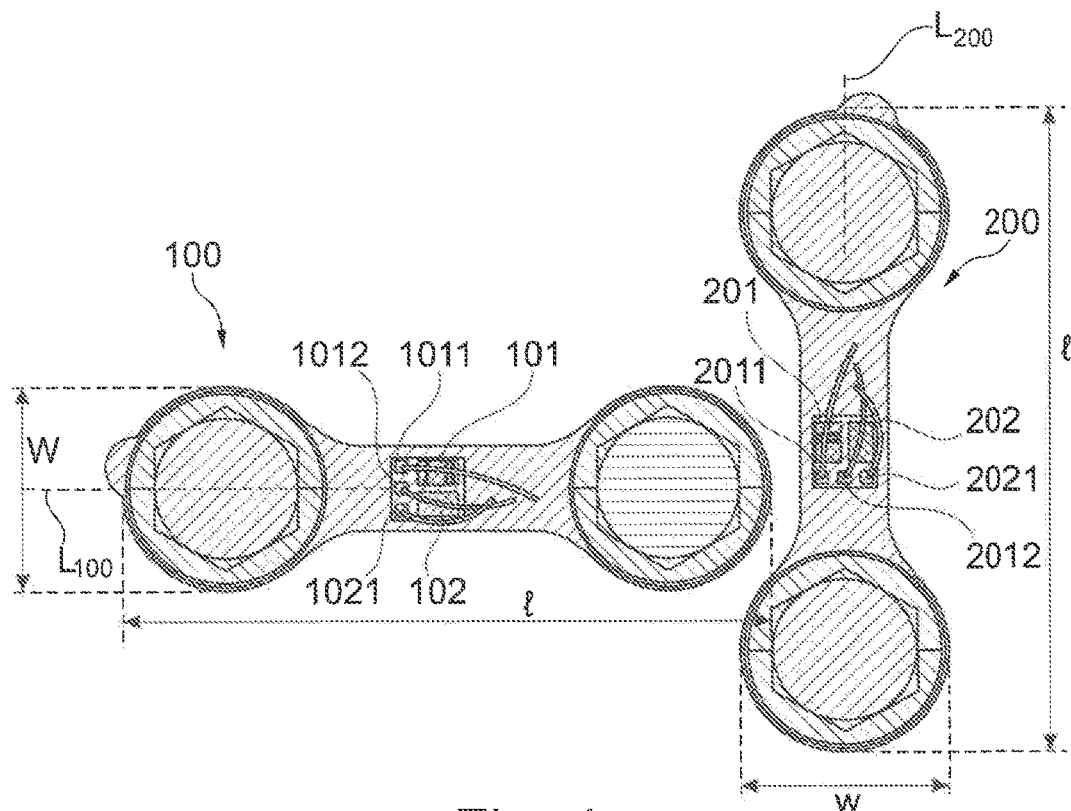
FIG. 1 shows a schematic top view of two baseplates.

FIG. 1 shows a first base plate 100 having a longitudinal axis $L_{100}$ and a second base plate 200 having a longitudinal axis $L_{200}$. The second base 200 plate is arranged perpendicular to the first base plate 100. The first base plate 100 and the second base plate 200 have the same elongate shape, having a length l and a width w. In the shown example, l is 8 cm and w is 1.8 cm. Of course, in other examples, the base plates 100, 200 may have another length. In certain embodiments, the base plates have a length l of at most 20 cm, or at most 10 cm. In other embodiments, the base plates have a length l of at least 4 cm, or at least 5 cm. In certain embodiments, the base plates have a width w of at most 5 cm, or at most 3 cm. In other embodiments, the base plates have a width w of at least 1 cm, or at least 1.5 cm.

The base plates 100 and 200 are made of the same material, in the shown example made of stainless steel. In other examples the base plates may comprise other metallic material (e.g. aluminium and/or cast iron) and/or other types of materials (e.g. plastic).

The second base plate 200 comprises a first strain sensor 201 and a second strain sensor 202 arranged perpendicular with respect to each other. The strain sensors 201 and 202 are mounted on a top side of the base plate 200. The second base plate 200 further comprises a third and a fourth strain sensor 203,204 arranged perpendicular with respect to each other and mounted on a bottom side of the base plate 200 (not shown).

The first base plate 100 comprises a first strain sensor 101 and a second strain sensor 102 arranged perpendicular with respect to each other. The strain sensors 101 and 102 are mounted on a top side of the base plate 102. The first base plate 100 further comprises a third and a fourth strain sensor 103,104 arranged perpendicular with respect to each other and mounted on a bottom side of the base plate 100 (not shown).

The first strain sensor 201 has a first electrical connection 2011 and the second strain sensor 202 has another first electrical connection 2021. The first and the second strain sensors have a common second electrical connection 2012.

The third strain sensor 203 has a first electrical connection 2031 and the fourth strain sensor 204 has another first electrical connection 2041. The third and the fourth strain sensors 203, 204 have a common second electrical connection 2032.

The first strain sensor 101 has a first electrical connection 1011 and the second strain sensor 102 has another first electrical connection 1021. The first and the second strain sensors 101, 102 have a common second electrical connection 1012.

The third and fourth strain sensors 103 and 104 of the first base plate 100 are configured and connected according to the third and fourth strain sensors 203, 204 of the second base plate 200.

The first strain sensor 101 is connected to the third strain sensor 103 via the electrical connection 1011 and the electrical connection 1031. The second strain sensor 102 is connected to the fourth strain sensor 104 via the electrical connection 1021 and the electrical connection 1041.

The first, second, third and fourth strain sensors 201, 202, 203, 204 of the second base plate 200 are connected accordingly.

Figures 2A, 2B:
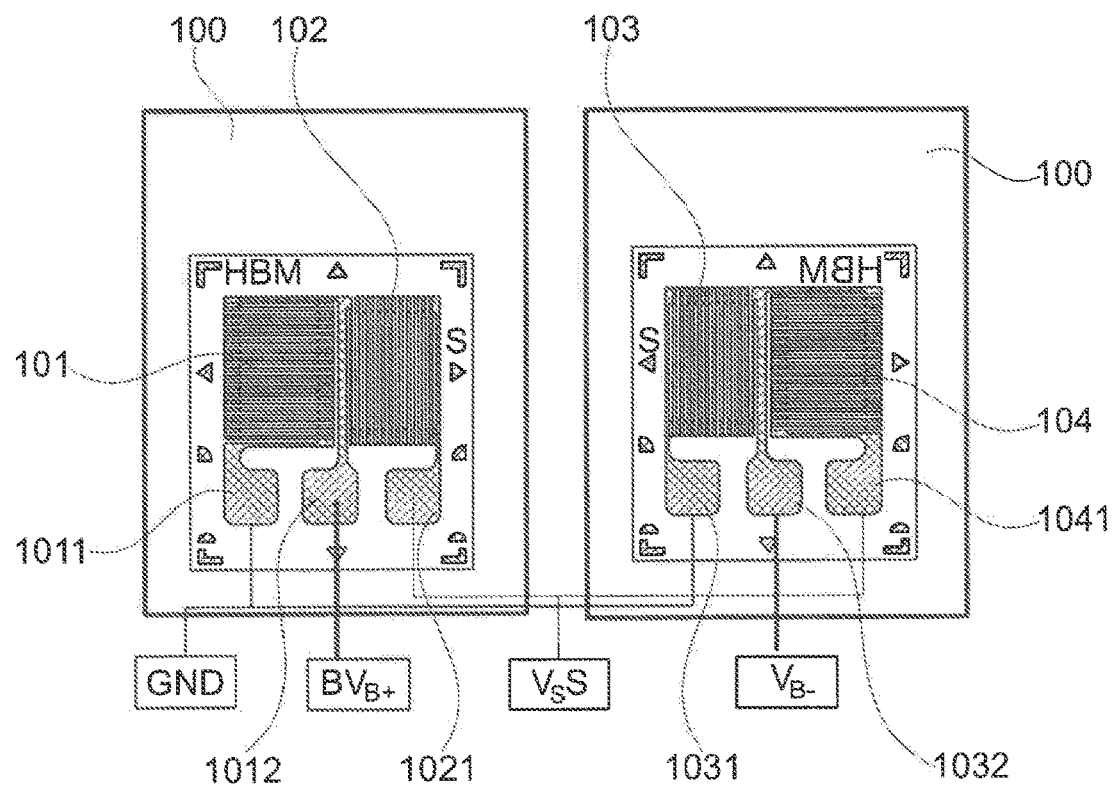
FIGS. 2A and 2B show a schematical top view of a section of a base plate according to FIG. 1.

FIG. 2A shows a schematical top view of a section of base plate 100 according to FIG. 1. FIG. 2B shows a schematical top view of a section of base plate 100 according to FIG. 1, wherein the base plate is shown in transparent such that a sensor arrangement on a bottom side of the base plate 100 is visible. The bottom sensor arrangement comprises two strain gauges arranged perpendicular with respect to each other.

In the following, an example calculation is shown.

Considering the layout for the base plate 100, the output voltage is $$VO = VB+ - VB- = k \cdot VS^4 (\epsilon_{tl} - \epsilon_{tt} + \epsilon_{bl} - \epsilon_{bt})$$

Wherein:
VO: output voltage, V
VS: supply voltage, V
VB+: voltage at the central point of TOP half bridge
VB−: voltage at the central point of BOTTOM half bridge
k: gauge factor, −
ϵ: mechanical strain, −
Wherein the subscripts means:
tl: top side, longitudinal direction
tt: top side, transversal direction
bl: bottom side, longitudinal direction
bt: bottom side, transversal direction Considering that each strain is composed of a strain due to load and an apparent strain due to temperature:

$$VO = k \cdot VS^4 (\epsilon_{tlload} + \epsilon_{tltemp} - (\epsilon_{ttload} + \epsilon_{tttemp}) + \epsilon_{blload} + \epsilon_{bltemp} - (\epsilon_{btload} + \epsilon_{bttemp}))$$

Considering an isotropic material, locally the temperature can be considered uniform and the strains are equal. Also, the transversal load can be related with longitudinal via the Poisson coefficient (v):

$$VO = k \cdot VS^4 (\epsilon_{tlload} + \epsilon_{temp} - (-v_{steel} \epsilon_{tlload} + \epsilon_{temp}) + \epsilon_{blload} + \epsilon_{temp} - (-v_{steel} \epsilon_{blload} + \epsilon_{temp}))$$

Leading to: $VO = k \cdot VS^4 (1 + v_{steel})(\epsilon_{tlload} + \epsilon_{blload})$ The top and bottom faces are cancelled out, thus eliminating the pure bending component, as well as apparent strains due to local temperature fluctuations.

The signals from the two baseplates are then acquired and subtracted via software, leading to:

$$\Delta V = VO_L - VO_T = k \cdot VS^4 (1+v_{steel})(\epsilon_{Ltlload}+\epsilon_{Lblload}-\epsilon_{Ttlload}-\epsilon_{Tblload})$$

Where the uppercase subscripts L and T refer to the longitudinal and to the transversal baseplates 100, 200. If each baseplate is deformed by a purely axial (bending is canceled anyway) and by temperature expansion or compression of a supporting machine element (for example, of an arm of an axle):

$$\Delta V = VO_L - VO_T = k \cdot VS^2 (1+v_{steel})(\epsilon_{Lload}+\epsilon_{Ltemp}-\epsilon_{Tload}-\epsilon_{Ttemp})$$

Considering again Poisson and the approximation of uniform temperature and isotropic material:

$$\Delta V = VO_L - VO_T = k \cdot VS^2 (1+v_{steel})(1+v_{cast\ iron})\epsilon_{load}$$

This additional operation approximately compensates for local (in the surrounding of the baseplates) temperature fluctuations while retaining traction and compression components. This traction and compression strains on the surface on the baseplates 100 and 200, (and on a surface of an axle or an arm on which the base plates are mounted) are mainly, but not only, caused by the bending of the axle/arm that, ultimately, is caused by the vertical load applied to it. In a stationary telehandler, for example, when a vertical load of a rear axle diminishes and approaches zero, it means that there is an incipient tipping-over.

Forces other than pure vertical load may cause the same traction and compression on the baseplates, for instance the ones induced by the steering system.

Non-local temperature fluctuations may not be compensated. For instance, if the tires are fixed and the axle is warmed or cooled, a bending (a real strain) of the axle itself is induced because its deformation is constrained. This will cause a traction or compression in the surface of the arm or axle (and baseplates) that will be measured by the sensor. If, on the other end, the axle or arm is warmed or cooled without constraining its deformation (an apparent strain), this will not be measured by the sensor, because it is approximately the same in every direction.

A resulting delta value may then normalized using two reference points derived from a calibration process, where the axle is characterized by acquiring the same delta value in two loading conditions:

Max load on the axle: boom retracted, lowered, unloaded

Unloaded axle: boom extended, lowered, loaded, rear wheels suspended.

Figure 3:
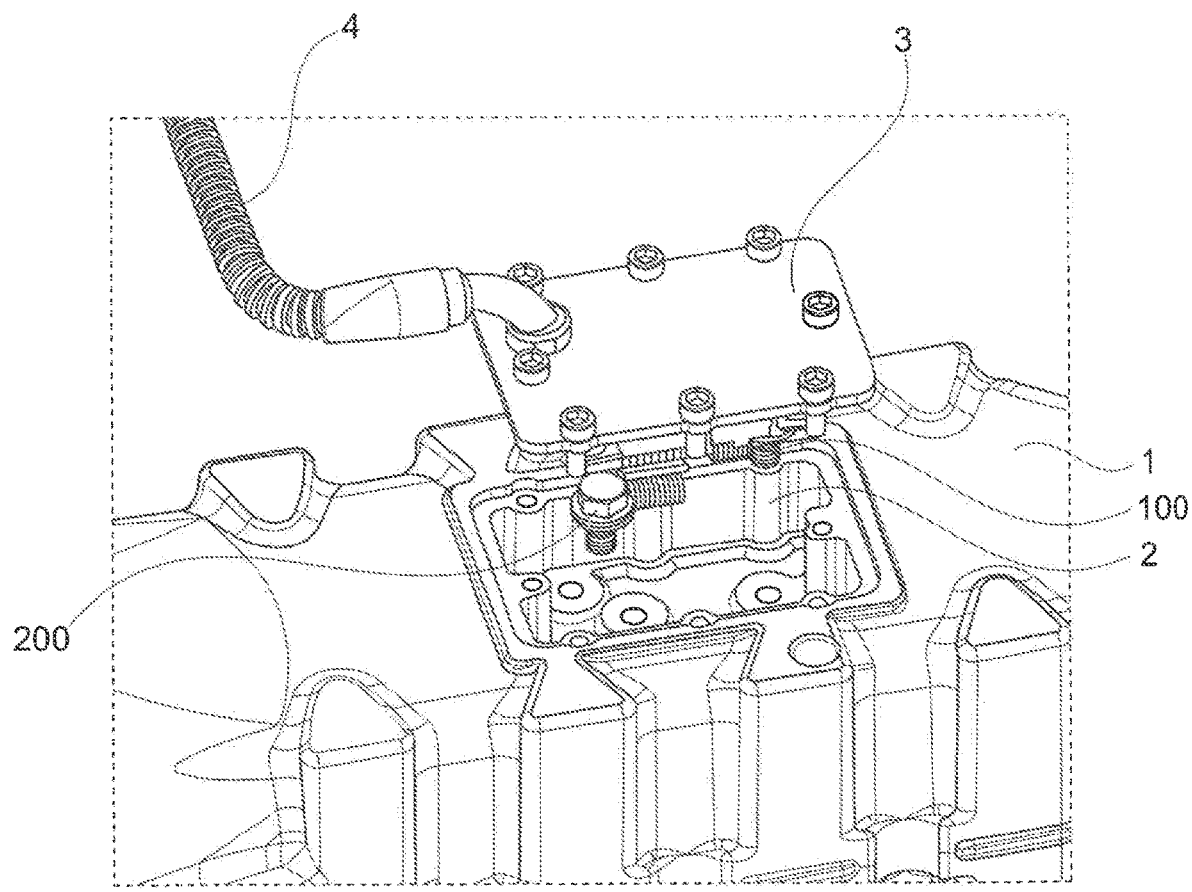
FIG. 3 shows a section of an axle having a recess.

In FIG. 3, a strain sensor system according to the above Figures is arranged in a cavity 2 of a vehicle axle 1. The cavity 2 comprises bores to receive screws of the base plates 100, 200. The cavity 2 may be closed by a lid screwed to the axle such that the sensor arrangement is protected from damage. The lid comprises a recess for passing through of cables 4, for example of a harness.

FIGS. 1, 2A, 2B, and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Throughout this specification relative language such as the words 'about' and 'approximately' may be used. Unless otherwise specified or described, this language seeks to incorporate at least 10% variability to the specified number or range. That variability may be plus 10% or negative 10% of the particular number specified.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. A strain sensor system, comprising:
 a first base plate having an elongate shape defining a first longitudinal axis;
 a first strain sensor disposed on the first base plate;
 a second base plate having an elongate shape defining a second longitudinal axis;
 a second strain sensor disposed on the second base plate; and
 a control unit configured to process measurement data produced by the first strain sensor and by the second strain sensor,
 wherein the first base plate and the second base plate are disposed such that the first longitudinal axis is arranged orthogonally or essentially orthogonally with respect to the second longitudinal axis.

2. The sensor system according to claim 1, wherein the first base plate and/or the second base plate include a first set of strain sensors comprising the first strain sensor and the second strain sensor, the second strain sensor being arranged orthogonally or essentially orthogonally with respect to the first strain sensor.

3. The strain sensor system according to claim 2, wherein the first base plate and/or the second base plate further include a second set of strain sensors, the second set comprising a third strain sensor and a fourth strain sensor, the fourth strain sensor being disposed essentially orthogonally with respect to the third strain sensor.

4. The strain sensor system according to claim 3, wherein the first strain sensor and/or the first set of strain sensors are/is disposed on a top side of the respective first base plate or second base plate; and/or
the second set of strain sensors is disposed on a bottom side opposite the top side of the respective first or second base plate.

5. The strain sensor system according to one of claim 2, wherein the first strain sensor of the first base plate and/or the first strain sensor of the second base plate have/has a first electrical connection, the second strain sensor of the first base plate and/or the second strain sensor of the second base plate have/has another first electrical connection, and the first and the second electrical strain sensors have a common second electrical connection.

6. The strain sensor system according to claim 3, wherein the third strain sensor of the first base plate and/or of the second base plate have/has a first electrical connection, the fourth strain sensor of the first base plate and/or of the second base plate have/has another first electrical connection, and the third and the fourth electrical strain sensors have a common second electrical connection.

7. The strain sensor system according to claim 6, wherein the first set of strain sensors and the second set of strain sensors of the first base plate and/or the first set of strain sensors and the second set of strain sensors of the second base plate are electrically connected, wherein the first electrical connection of the first strain sensor and the first electrical connection of the third strain sensor are connected and the first electrical connection of the second strain sensor and the first electrical connection of the fourth strain sensor are connected.

8. The strain sensor system according to claim 1, wherein the first base plate and the second base plate have identical elongate shapes.

9. The strain sensor system according to claim 1, wherein the first base plate and the second base plate are made of the same material.

10. The strain sensor system according to claim 1, wherein the first base plate and the second base plate each have a length l, wherein a maximal distance between the first base plate and the second base plate is at most 1, at most ½, or at most ⅓.

11. The strain sensor system according to claim 3, wherein the first strain sensor and/or the second strain sensor and/or the third strain sensor and/or the fourth strain sensor of the first base plate and/or the first strain sensor and/or the second strain sensor and/or the third strain sensor and/or the fourth strain sensor of the second base plate are each configured to measure a strain in the respective base plate on which they are mounted.

12. The strain sensor system according to claim 3, wherein the control unit
is connected to the first strain sensor and/or the second strain sensor and/or the third strain sensor and/or the fourth strain sensor of the first base plate and/or is connected to the first strain sensor and/or second strain sensor and/or the third strain sensor and/or the fourth strain sensor of the second base plate; and
wherein the control unit is configured to receive measurement data of the respective strain sensor and configured to process measurement data produced by the respective strain sensor, such as to compare measurement data of the respective strain sensor of the first base plate with the measurement data of the respective strain sensor of the second base plate, and/or to compare the measurement of a combination of strain sensors on the first base plate with the same combination of strain sensors on the second base plate.

13. The strain sensor system according to claim 12, wherein the control unit is configured to determine, based on the measurement data of the respective strain sensor of the first base plate and based on the measurement data of the respective strain sensor of the second base plate, if the measurement data of the respective strain sensor of the second base plate is indicative of an impending tip-over of a vehicle and/or of a load on an axle.

14. The strain sensor system according to claim 12, characterized in that the control unit is configured to adjust the measurement data on which a determination of whether an impending tip-over of a vehicle is based.

15. The strain sensor system according to claim 12, wherein the control unit is configured to adjust the measurement data when a strain measured along the longitudinal axis of the first base plate is identical to a strain measured along a longitudinal axis of the second base plate, wherein the control unit is configured to decrease the determined strain by the identified identical strain value measured along the longitudinal axis of the first base plate and the second base plate.

16. A machine element, such as a vehicle axle, including a strain sensor system according to claim 1.

17. The machine element according to claim 16, comprising a recess, wherein the first and/or the second base plate are/is disposed in the recess.

18. The machine element according to claim 16, wherein the base plates are screwed to the machine element.

\* \* \* \* \*